Oct. 24, 1944.   T. R. SMITH   2,361,244
PISTON AND PISTON ROD ASSEMBLY
Filed March 13, 1943
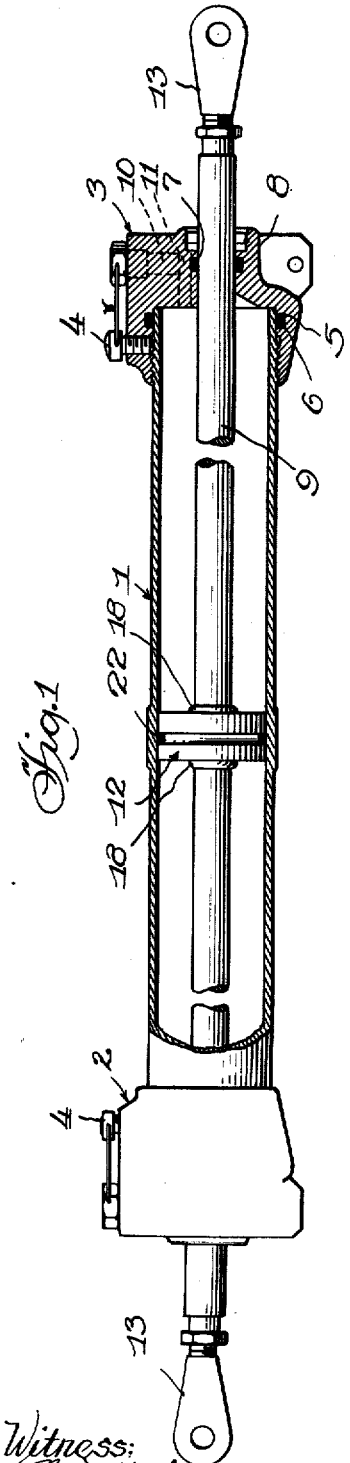
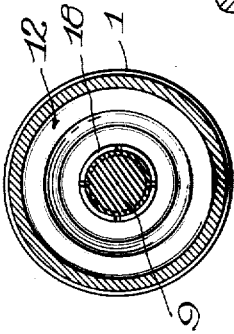
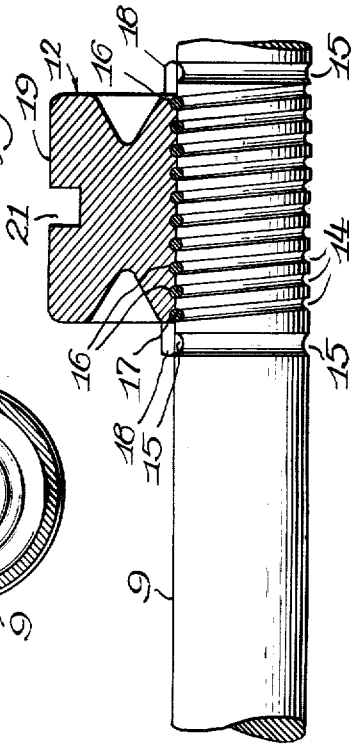
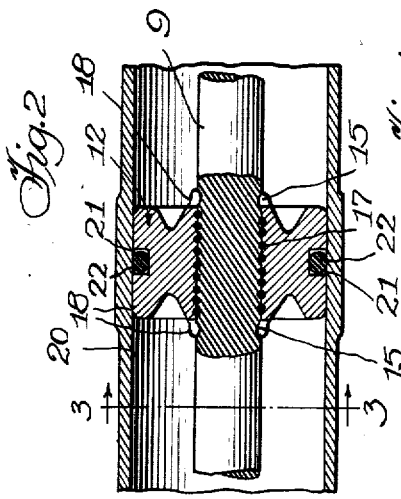
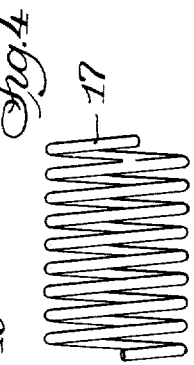
INVENTOR.
Thomas R. Smith
BY Parkinson & Lane
Attys
Witness:

Patented Oct. 24, 1944

2,361,244

UNITED STATES PATENT OFFICE 2,361,244

PISTON AND PISTON ROD ASSEMBLY

Thomas R. Smith, Newton, Iowa, assignor to The Maytag Company, Newton, Iowa, a corporation of Delaware Application March 13, 1943, Serial No. 479,077

7 Claims. (Cl. 309—17)

The present invention relates to a piston and piston rod assembly for an hydraulic wing flap cylinder and especially to a novel means and manner of assembling a piston on a piston rod wherein the rod extends through and beyond both the opposite sides or ends of the piston.

Among the objects of the present invention is to provide a novel means and manner of assembling a piston on an integral or one-piece piston rod extending beyond the opposite sides or ends of the piston and by which the two are quickly assembled and maintained in accurate alignment.

A further object is to provide a novel means and manner of mounting a piston upon an intermediate portion of a piston rod and maintaining it in assembled relation by means of a spiral key. In this novel arrangement the piston and piston rod are provided or formed with mating spiral grooves, and a spiral key spring connects these members together.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in side elevation with portions of the cylinder and piston rod broken away.

Figure 2 is an enlarged fragmentary view in vertical cross section through the cylinder and piston.

Figure 3 is a view in vertical cross section taken on the line 3—3 of Figure 2.

Figure 4 is a view in side elevation of the spiral key spring.

Figure 5 is a fragmentary view of the piston and piston rod and showing the manner of locking the piston and piston rod in assembled relation.

Referring more particularly to the disclosure in the drawing, the embodiment therein shown to illustrate the present invention comprises a cylinder 1 having a head 2 and a head 3 at its opposite ends. As shown more clearly in Figure 1, these heads are threaded upon the end of the cylinder and locked thereon by means of an adjustable set screw 4. To prevent the head from becoming disengaged, this set screw is retained in locked position by any suitable means.

In order to seal the head against leakage of the hydraulic fluid or oil which is adapted to be transferred to the opposite ends of the cylinder, the heads are each provided with an annular inwardly opening channel 5 in which is mounted a resilient sealing ring 6 of natural or compounded synthetic rubber or the like having a sealing contact with the cylinder adjacent its ends and at all times effecting optimum sealing between these parts. Similarly, each head is provided with an annular inwardly opening recess or groove 7 provided with a sealing ring 8 having a continuous sealing contact between the piston rod 9 and the head. Each head is also provided with an opening 10 aligned with a passage 11 entering one end of the cylinder for transferring hydraulic fluid or oil from a suitable source of fluid supply into the opposite ends of the cylinder for moving the piston 12 and piston rod 9 in either desired direction.

In the present embodiment, this piston rod is provided at its opposite ends with a suitable end fitting 13 for hydraulically actuating a wing flap of an airplane (not shown).

The present novel invention relates particularly to the novel piston and piston rod assembly in which the piston 12 is mounted on an intermediate portion of the piston rod 9. Ordinarily in assembling a piston and piston rod wherein the rod extends beyond the opposite ends or sides of the piston, the piston is threaded onto the rod or the rod is made into two sections and then the adjoining ends of these sections are threaded onto each end or side of the piston. Where the rod is made in one piece and the piston is threaded thereon, it is necessary to machine approximately the entire length of the rod but leaving sufficient stock at the intermediate portion upon which the piston is to be mounted for threads, or else to upset this intermediate portion in order to obtain sufficient stock for the threads. This operation is not satisfactory and it is impossible to run these rods over a centerless grinder for high production due to the fact that there are threads to be produced intermediate the ends of the rod.

Where the rod is broken in two or made in two sections with the adjacent ends connected to the opposite ends of the piston, there is always danger of misalignment. This is also an unsatisfactory method, and when assembled in either of these two prior methods, the alignment of the piston on the rod is dependent on the thread. In actual mass production, it has been found impossible to hold sufficiently accurate alignment between the piston and the piston rod so that it is necessary to machine the piston after it has been assembled on the rod or rods.

In the present novel construction the piston rod 9 is made in one piece and may be run through a centerless grinder. After the rod has been ground to size, thread grooves 14 are cut into the piston rod and an annular recess 15 is provided at the opposite ends of these threads. The piston 12 may be completely finished before assembling on the rod, with mating grooves 16 cut into the internal diameter of the piston, and when assembled by the novel means and method herein disclosed, the piston and integral piston rod are maintained in accurate alignment. This assembly is accomplished by means of a spiral key spring 17 which is threaded into the grooves in the piston rod, after which the piston is screwed onto the spiral key spring.

It will be appreciated that the alignment between the piston and piston rod will be maintained by the flat, accurately machined surfaces between the spiral grooves on these members. Thus the alignment between the piston and piston rod is as accurate as the fit between the ground diameter of the rod and the broached hole of the piston. The spiral key spring simply prevents the piston from moving back and forth on the rod and does not affect the alignment or concentricity of the piston and piston rod as is the case in the ordinary type thread where the bearing surface occurs on the threads. In this novel construction, arrangement and assembly, the bearing occurs between the piston and the piston rod surfaces radially, and the lateral loads or lengthwise loads are taken by the spiral key spring.

In order to prevent leakage, litharge and glycerin may be applied when the piston is assembled on the rod, and in order to lock the piston and rod assembly together, the opposite ends 18, 18 of the hub of the piston are swedged into annular grooves or recesses 15. To facilitate this swedging operation, the ends of the hub are preferably slotted or split as shown in Figure 3. In order to prevent leakage between the outer diameter 19 of the piston and the inner wall 20 of the cylinder, the piston is provided with an outwardly opening annular channel 21 in which is provided a sealing ring 22 extending beyond the circumference of the piston and adapted at all times to maintain a wiping contact with the interior of the cylinder. This sealing member is preferably formed of a resilient material such as a natural or compounded synthetic rubber or other material suitable for the purpose.

Having thus disclosed the invention, I claim:

1. A piston and piston rod assembly comprising a piston rod provided with spiral grooves intermediate its ends, a piston provided with mating grooves, and a spiral key spring threaded into the grooves of the piston rod after which the piston is threaded onto the spring.

2. A piston and piston rod assembly comprising a piston rod and piston adapted to be assembled upon the rod intermediate its length and whereby the rod extends through the piston and beyond its opposite ends for actuating mechanisms connected to the ends of the rod, mating grooves provided in the piston and on the rod intermediate its ends, and a spring threaded into the grooves on the rod and anchored within the mating grooves for connecting the piston and rod and preventing longitudinal movement of the piston upon the rod.

3. A piston and piston rod assembly comprising a piston rod having a fitting upon its opposite ends, spiral grooves formed on an intermediate portion of the rod, a piston formed with an opening having spiral grooves formed in its inner diameter and mating with the grooves formed on the rod, means adapted to be received in the mating grooves for mounting the piston onto the rod, and means for locking the opposite sides of the piston upon the rod.

4. A piston and piston rod assembly comprising a piston rod having spiral grooves formed on an intermediate portion thereof, a piston provided with an opening having spiral grooves formed in its inner diameter and mating with the grooves formed on the rod, and a spiral key spring threaded into the grooves on the piston rod and thereafter adapted to receive the grooves in the piston for connecting the latter onto the rod.

5. A piston and piston rod assembly comprising a piston rod having spiral grooves formed on an intermediate portion thereof, a piston provided with an opening having spiral grooves formed in its inner diameter and mating with the groove formed on the rod, a spiral key spring adapted to be threaded into the grooves on the piston rod and to receive the grooves in the piston for connecting the latter onto the rod, and means for locking the opposite sides of the piston to the piston rod and thereby form a unitary assembly.

6. A piston and piston rod assembly comprising a piston rod having spiral grooves provided on an intermediate portion thereof, a piston having a hub provided with internal spiral grooves, a spiral key spring adapted to seat within the grooves in the piston and on the rod, and means for locking the opposite ends of the hub upon the piston rod.

7. A piston and piston rod assembly comprising a piston rod having spiral grooves provided in an intermediate portion thereof and an annular recess provided at each end of the grooves, a piston having a hub formed with internal spiral grooves, a spiral key spring adapted to seat within the grooves in the piston and rod, and the opposite ends of the hub being swedged into the recesses for locking the piston upon the rod.

THOMAS R. SMITH.